(12) United States Patent
Osakabe et al.

(10) Patent No.: US 9,028,013 B2
(45) Date of Patent: May 12, 2015

(54) BRAKING DEVICE AND VEHICLE

(75) Inventors: Taro Osakabe, Susono (JP); Takayuki Kaneko, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/808,365

(22) PCT Filed: Jun. 29, 2011

(86) PCT No.: PCT/JP2011/064953
§ 371 (c)(1),
(2), (4) Date: Mar. 15, 2013

(87) PCT Pub. No.: WO2012/005156
PCT Pub. Date: Jan. 12, 2012

(65) Prior Publication Data
US 2013/0168935 A1 Jul. 4, 2013

(30) Foreign Application Priority Data
Jul. 5, 2010 (JP) .................................. 2010-153144

(51) Int. Cl.
*B60T 8/44* (2006.01)
*B60T 11/20* (2006.01)
*B62D 63/04* (2006.01)

(52) U.S. Cl.
CPC ................. *B60T 11/20* (2013.01); *B62D 63/04* (2013.01)

(58) Field of Classification Search
USPC ........... 188/151 R, 152, 358–360; 303/114.1; 60/547.1–592
See application file for complete search history.

(56) References Cited

U.S. PATENT DOCUMENTS

| 3,559,406 | A | * | 2/1971 | Gardner | 60/553 |
| 3,589,131 | A | * | 6/1971 | Grabb | 60/549 |
| 4,294,070 | A | * | 10/1981 | Farr | 60/534 |
| 4,809,181 | A | | 2/1989 | Ito et al. | |
| 4,924,755 | A | | 5/1990 | Flory | |

(Continued)

FOREIGN PATENT DOCUMENTS

| DE | 2820047 | | 1/1979 |
| DE | 19903014 | A1 | 8/2000 |

(Continued)

OTHER PUBLICATIONS

International Search Report Issued Oct. 4, 2011 in PCT/JP11/064953 Filed Jun. 29, 2011.

(Continued)

*Primary Examiner* — Christopher Schwartz
(74) *Attorney, Agent, or Firm* — Oblon, McClelland, Maier & Neustadt, L.L.P.

(57) ABSTRACT

Provided is a driving device that applies a braking force to a first tire and a second tire rotatably arranged in a vehicle body. The driving device includes: a master cylinder configured to include a first liquid pressure chamber and a second liquid pressure chamber that supply a liquid pressure; a piston configured to apply an external force to the first liquid pressure chamber and the second liquid pressure chamber; a first hydraulic braking unit configured to apply a braking force to the first tire based on the liquid pressure supplied from the first liquid pressure chamber; and a second hydraulic braking unit configured to apply a braking force to the second tire based on the liquid pressure supplied from the second liquid pressure chamber.

10 Claims, 8 Drawing Sheets

(56) References Cited

U.S. PATENT DOCUMENTS

| | | | |
|---|---|---|---|
| 4,996,843 A | 3/1991 | Levrai | |
| 5,236,257 A * | 8/1993 | Monzaki et al. | 303/114.1 |
| 5,474,367 A | 12/1995 | Gaines | |
| 6,003,959 A | 12/1999 | Katayose et al. | |
| 6,829,524 B2 | 12/2004 | Chee | |
| 7,159,696 B2 * | 1/2007 | Kusano | 188/152 |
| 2002/0000751 A1 * | 1/2002 | Nishii et al. | 303/113.1 |
| 2002/0023437 A1 * | 2/2002 | Kanazawa et al. | 60/562 |
| 2004/0227396 A1 * | 11/2004 | Kusano | 303/113.1 |
| 2005/0110341 A1 * | 5/2005 | Kusano | 303/113.4 |
| 2005/0236890 A1 * | 10/2005 | Matsuno et al. | 303/114.1 |
| 2009/0126362 A1 * | 5/2009 | Nen et al. | 60/585 |
| 2010/0116603 A1 | 5/2010 | Kitchell | |
| 2010/0312447 A1 | 12/2010 | Perkins | |
| 2013/0001026 A1 | 1/2013 | Osakabe et al. | |

FOREIGN PATENT DOCUMENTS

| | | |
|---|---|---|
| JP | 53 30092 | 3/1978 |
| JP | 61-249861 A | 11/1986 |
| JP | 2-28046 A | 1/1990 |
| JP | 2007 168694 | 7/2007 |
| JP | 2008 37259 | 2/2008 |

OTHER PUBLICATIONS

Office Action mailed on Aug. 21, 2014, in Co-pending U.S. Appl. No. 13/583,167.

Office Action mailed Apr. 4, 2014 in co-pending U.S. Appl. No. 13/583,167.

* cited by examiner

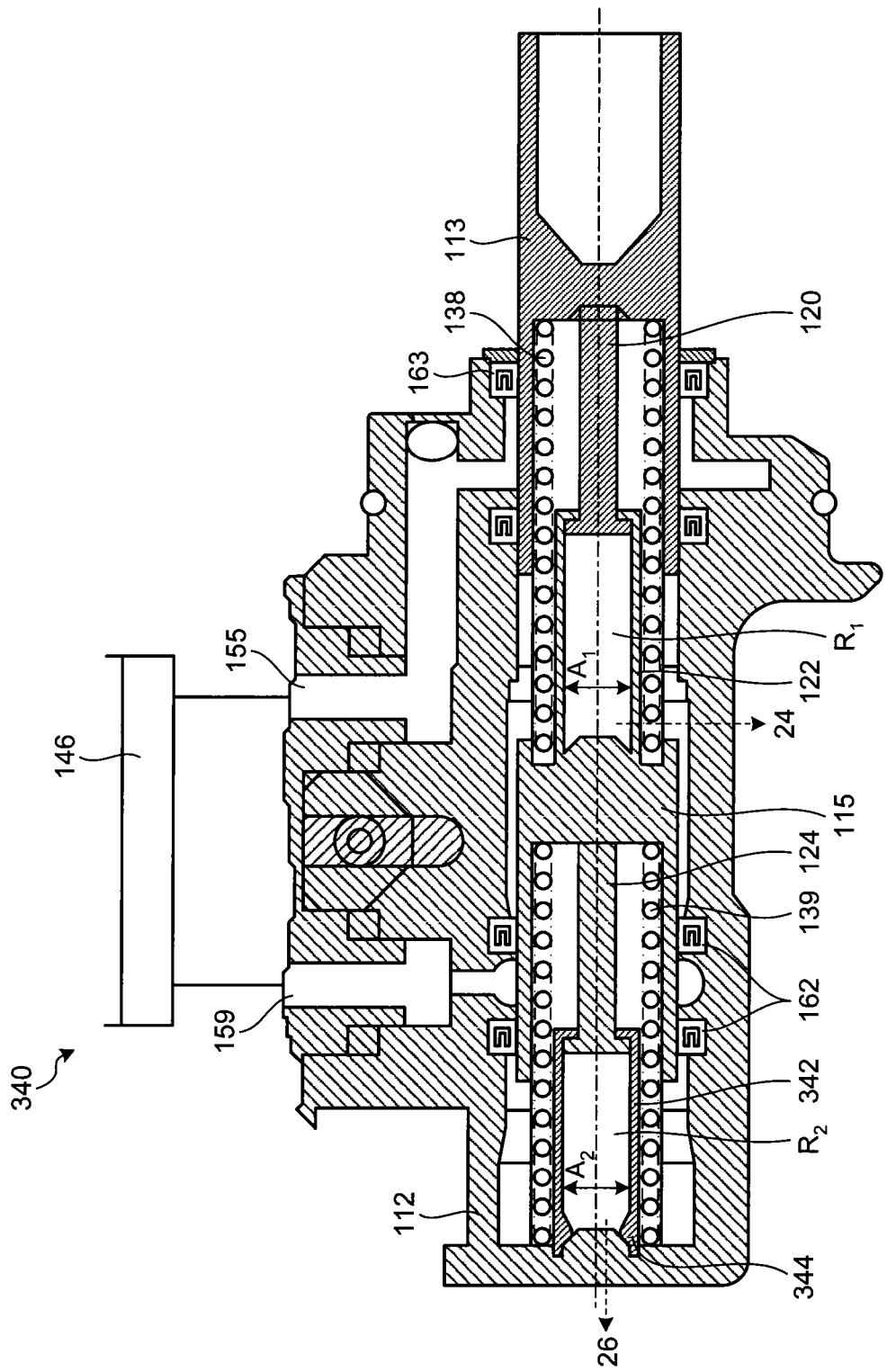

BRAKING DEVICE AND VEHICLE

FIELD

The present invention relates to a braking device which exerts a braking force when decreasing a speed and to a vehicle.

BACKGROUND

A vehicle such as an automobile is equipped with a braking device such as a brake so as to decelerate and stop the running vehicle. The braking device decelerates and stops the vehicle by applying a load to a rotating tire, an axle, and a driving mechanism in a direction in which the rotation is suppressed.

Here, as a device which controls the braking force of the braking device, for example, Patent Literature 1 discloses a vehicle steering control device which includes a roll rigidity changing unit for changing the roll rigidity of a vehicle and a driving/braking force applying unit for applying a driving/braking force to a vehicle wheel. The vehicle running control device includes a control unit which calculates a yaw moment necessary for counteracting an extra yaw moment acting on the vehicle based on a difference in the roll rigidity of the vehicle with respect to the roll direction of the vehicle when an abnormal fixation causing the different roll rigidity of the vehicle occurs in the roll rigidity changing unit by the roll direction of the vehicle and controls a driving/braking force difference between left and right wheels so as to apply the necessary yaw moment to the vehicle. The device disclosed in Patent Literature 1 can improve the straight running performance by adjusting the braking forces of the left and right wheels if necessary. Further, as a device for adjusting the braking force, ABS (Anti-lock Brake System) control or VCS (Vehicle Control System) control is also known.

CITATION LIST

Patent Literature

Patent Literature 1: Japanese Patent Application Laid-open No. 2007-168694

SUMMARY

Technical Problem

Here, the vehicle may be biased when braking the vehicle. That is, when the brake is operated, the vehicle may be stopped while being bent in one direction. Even in such a case, the vehicle can be suppressed from being biased by controlling the braking force using the device disclosed in Patent Literature 1, the ABS control, or the VCS control.

However, since the control device disclosed in Patent Literature 1 performs the control based on the detection value, the same braking force is applied to the left and right vehicle wheels before starting the control. Here, the distance between the gravity center and the left vehicle wheel and the distance between the gravity center and the right vehicle wheel are different from each other at the left and right sides of the vehicle body. For this reason, when the same braking force is applied to the left and right vehicle wheels, a rotation moment is generated, and hence the vehicle body is biased.

The present invention is made in view of the above-described circumstances, and it is an object of the present invention to provide a braking device capable of effectively suppressing a vehicle body from being biased when braking a vehicle body and provide a vehicle having the same.

Solution to Problem

In order to solve the above mentioned problem and achieve the object, a braking device according to the present invention that applies a braking force to a first tire and a second tire rotatably arranged in a vehicle body, the driving device includes a master cylinder configured to include a first liquid pressure chamber and a second liquid pressure chamber that supply a liquid pressure; a piston configured to apply an external force to the first liquid pressure chamber and the second liquid pressure chamber; a first hydraulic braking unit configured to apply a braking force to the first tire based on the liquid pressure supplied from the first liquid pressure chamber; and a second hydraulic braking unit configured to apply a braking force to the second tire based on the liquid pressure supplied from the second liquid pressure chamber, wherein a difference in a ratio between a pressure of the first liquid pressure chamber and a pressure of the second liquid pressure chamber in the master cylinder when a stroke amount of the piston is large becomes larger than a difference in the ratio of the pressure when the stroke amount of the piston is small.

Further, it is preferable that the pressure of the first liquid pressure chamber is equal to the pressure of the second liquid pressure chamber in the master cylinder in a state where the stroke amount of the piston is smaller than a set value.

Further, it is preferable that the pressure of the first liquid pressure chamber is different from the pressure of the second liquid pressure chamber in the master cylinder when an external force is applied from the piston.

Further, it is preferable that at least one of the first liquid pressure chamber and the second liquid pressure chamber in the master cylinder is provided with a return spring or a multi-stage spring having a non-linear spring characteristic.

Further, it is preferable that a sliding resistance generated inside the first liquid pressure chamber with respect to the movement of the piston and a sliding resistance generated inside the second liquid pressure chamber with respect to the movement of the piston in the master cylinder change by the stroke amount of the piston.

Further, it is preferable that the first liquid pressure chamber in the master cylinder is disposed nearer an end receiving the external force from the piston in relation to the second liquid pressure chamber, and the second liquid pressure chamber is provided with a resisting component that makes a decrease in a volume of the liquid pressure chamber difficult when the stroke amount of the piston increases.

In order to solve the above mentioned problem and achieve the object, a vehicle according to the present invention includes a vehicle body; and a braking device configured to apply a braking force to the vehicle body, wherein the braking device is set so that the braking force close to a gravity center is larger than the braking force away from the gravity center in a direction perpendicular to the running direction of the vehicle body while a rider gets in the vehicle, and the braking device is set so that a difference in the ratio between the braking force close to the gravity center and the braking force away from the gravity center when the braking force is large becomes larger than a difference in the ratio between the braking force close to the gravity center and the braking force away from the gravity center when the braking force is small.

Further, it is preferable to further include a first tire rotatably disposed so as to be close to the gravity center of the vehicle body; and a second tire rotatably disposed so as to be away from the gravity center of the vehicle body, wherein the braking device includes a master cylinder configured to include a first liquid pressure chamber and a second liquid pressure chamber that supply a liquid pressure, a first hydraulic braking unit configured to apply a braking force to the first tire based on the liquid pressure supplied from the first liquid pressure chamber, and a second hydraulic braking unit configured to apply a braking force to the second tire based on the liquid pressure supplied from the second liquid pressure chamber, wherein when the braking force increases, the pressure of the first liquid pressure chamber becomes larger than the pressure of the second liquid pressure chamber.

Further, it is preferable that the master cylinder includes a first piston and a first cylinder that constitute the first liquid pressure chamber, a first spring that supports the first piston, a second piston and a second cylinder that constitute the second liquid pressure chamber, and a second spring that supports the second piston, and at least one of the first spring and the second spring has a non-linear spring characteristic, and when the braking force increases, a spring constant of the second spring becomes larger than that of the first spring.

Further, it is preferable that the first tire and the second tire are disposed at the front side of the vehicle body in the running direction.

Advantageous Effects of Invention

The braking device and the vehicle according to the present invention have an effect that the biasing of the vehicle body can be effectively suppressed when braking the vehicle.

BRIEF DESCRIPTION OF DRAWINGS

FIG. 10 is a schematic diagram illustrating another example of the master cylinder of the braking device.

DESCRIPTION OF EMBODIMENTS

Figure 1:
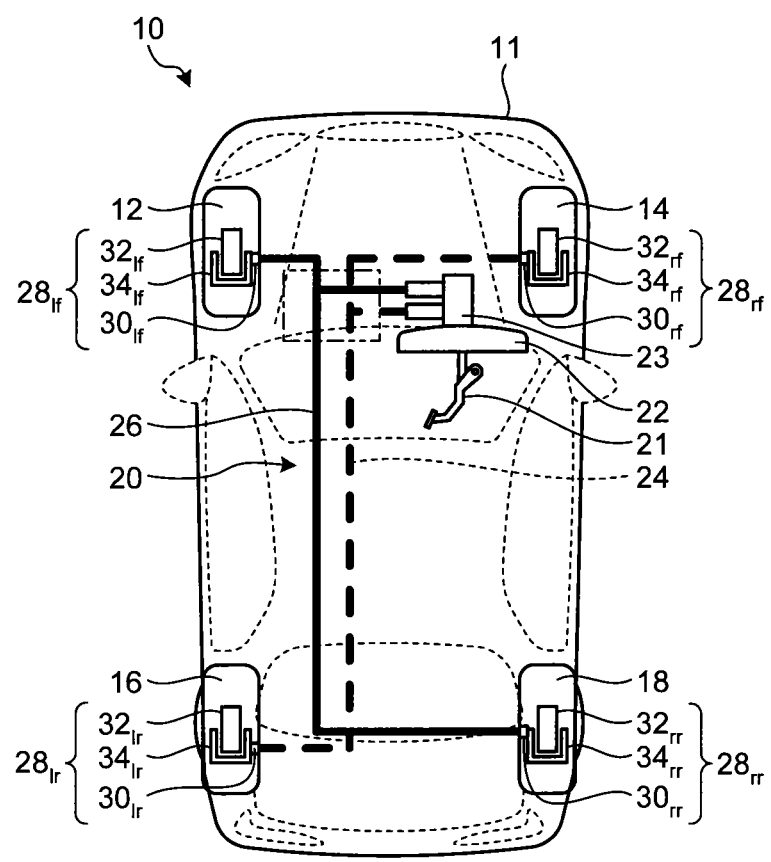
FIG. 1 is a schematic diagram illustrating a schematic configuration of a vehicle having a braking device.

Hereinafter, the present invention will be described in detail by referring to the drawings. Furthermore, the present invention is not limited to a mode for carrying out the present invention below (hereinafter, referred to as an embodiment). Further, the constituents of the embodiment below include a constituent which can be easily supposed by the person skilled in the art, a substantially identical constituent, and a so-called equivalent constituent. Further, the constituents disclosed in the embodiment below can be appropriately combined with each other. Hereinafter, a vehicle according to an embodiment of the present invention will be described in detail based on the drawings. Furthermore, the present invention is not limited to the embodiment.

[Embodiment]

FIG. 1 is a schematic diagram illustrating a schematic configuration of a vehicle having a braking device. As illustrated in FIG. 1, a vehicle 10 includes a vehicle body 11, a left front tire 12, a right front tire 14, a left rear tire 16, a right rear tire 18, and a braking device 20. Furthermore, although it is not illustrated in the drawings, the vehicle 10 includes various constituents needed as the vehicle, such as a driving source, a power transmitting unit, an operating unit, and a seat other than the above-described configuration.

The vehicle body 11 is a casing, that is, a body of the vehicle 10. The vehicle body 11 includes therein the driving source, the power transmitting unit, the operating unit, the seat, and the like.

The left front tire 12, the right front tire 14, the left rear tire 16, and the right rear tire 18 are disposed at four corners of the vehicle body 11, and contact a road surface. When the left front tire 12, the right front tire 14, the left rear tire 16, and the right rear tire 18 are rotated by the driving source and the power transmitting unit, the driving force is transmitted to the road surface, so that the vehicle body 11 moves relative to the road surface.

The braking device 20 includes a brake pedal 21 which is operated by a driver, a brake booster device (a brake booster) 22 which boosts a pedal stepping-on force input to the brake pedal 21, a master cylinder 23 which converts the pedal stepping-on force boosted by the brake booster device 22 into a liquid pressure (a hydraulic pressure) of a brake liquid, a first hydraulic pipe 24 and a second hydraulic pipe 26 which circulate a hydraulic pressure supplied from the master cylinder 23, and hydraulic braking units $28_{lf}$, $28_{rf}$, $28_{lr}$, and $28_{rr}$ which are arranged so as to correspond to the respective tires and generate a braking force by the hydraulic pressure supplied from the first hydraulic pipe 24 and the second hydraulic pipe 26. Furthermore, the first hydraulic pipe 24 is connected to the hydraulic braking unit $28_{rf}$ and the hydraulic braking unit $28_{lr}$. Further, the second hydraulic pipe 26 is connected to the hydraulic braking unit $28_{lf}$ and the hydraulic braking unit $28_{rr}$.

Here, the hydraulic braking unit $28_{lf}$ applies a braking force to the left front tire 12, the hydraulic braking unit $28_{rf}$ applies a braking force to the right front tire 14, the hydraulic braking unit $28_{lr}$ applies a braking force to the left rear tire 16, and the hydraulic braking unit $28_{rr}$ applies a braking force to the right rear tire 18. The hydraulic braking unit $28_{lf}$ includes a wheel cylinder $30_{lf}$ to which a hydraulic pressure is supplied from the master cylinder 23 through the second hydraulic pipe 26, a brake rotor $32_{lf}$ which rotates along with the vehicle wheel (the left front tire 12), and a brake pad $34_{lf}$ which is supported by the vehicle body 11 so as not to be rotatable, changes in position by the wheel cylinder $30_{lf}$, and contacts the brake rotor $32_{lf}$ when braking the vehicle. The hydraulic braking unit $28_{lf}$ has the above-described configuration, and when a high hydraulic pressure (a hydraulic pressure used when braking the vehicle) is supplied from the master cylinder 23, the wheel cylinder $30_{lf}$ moves the brake pad $34_{lf}$ in a direction in which the brake pad is pressed against the brake rotor $32_{lf}$. Accordingly, the brake pad $34_{lf}$ and the brake rotor $32_{lf}$ contact each other, thereby applying a force exerted in a direction of stopping the rotation to the brake rotor $32_{lf}$. In this way, the hydraulic braking unit $28_{lf}$ applies the braking force to the tire disposed at the opposite position by the hydraulic pressure supplied from the master cylinder 23.

Next, the hydraulic braking units $28_{rf}$, $28_{lr}$, and $28_{rr}$ basically have the same configurations as that of the hydraulic braking unit $28_{lf}$ except for the different arrangement positions (the corresponding tires). In the hydraulic braking unit $28_{rf}$, a position of a wheel cylinder $30_{rf}$ changes by the hydraulic pressure supplied from the first hydraulic pipe 24, and when braking the vehicle, a high hydraulic pressure is supplied from the first hydraulic pipe 24 to the wheel cylinder $30_{rf}$ so as to cause a brake pad $34_{rf}$ to contact a brake rotor $32_{rf}$, thereby applying a braking force to the right front tire 14. In the hydraulic braking unit $28_{lr}$, a position of a wheel cylinder $30_{lr}$ changes by the hydraulic pressure supplied from the first hydraulic pipe 24, and when braking the vehicle, a high hydraulic pressure is supplied from the first hydraulic pipe 24 to the wheel cylinder $30_{lr}$ so as to cause a brake pad $34_{lr}$ to contact a brake rotor $32_{lr}$, thereby applying a braking force to the left rear tire 16. In the hydraulic braking unit $28_{rr}$, a position of a wheel cylinder $30_{rr}$ changes by the hydraulic pressure supplied from the second hydraulic pipe 26, and when braking the vehicle, a high hydraulic pressure is supplied from the second hydraulic pipe 26 to the wheel cylinder $30_{rr}$ so as to cause a brake pad $34_{rr}$ to contact a brake rotor $32_{rr}$, thereby applying a braking force to the right rear tire 18.

Figure 2:
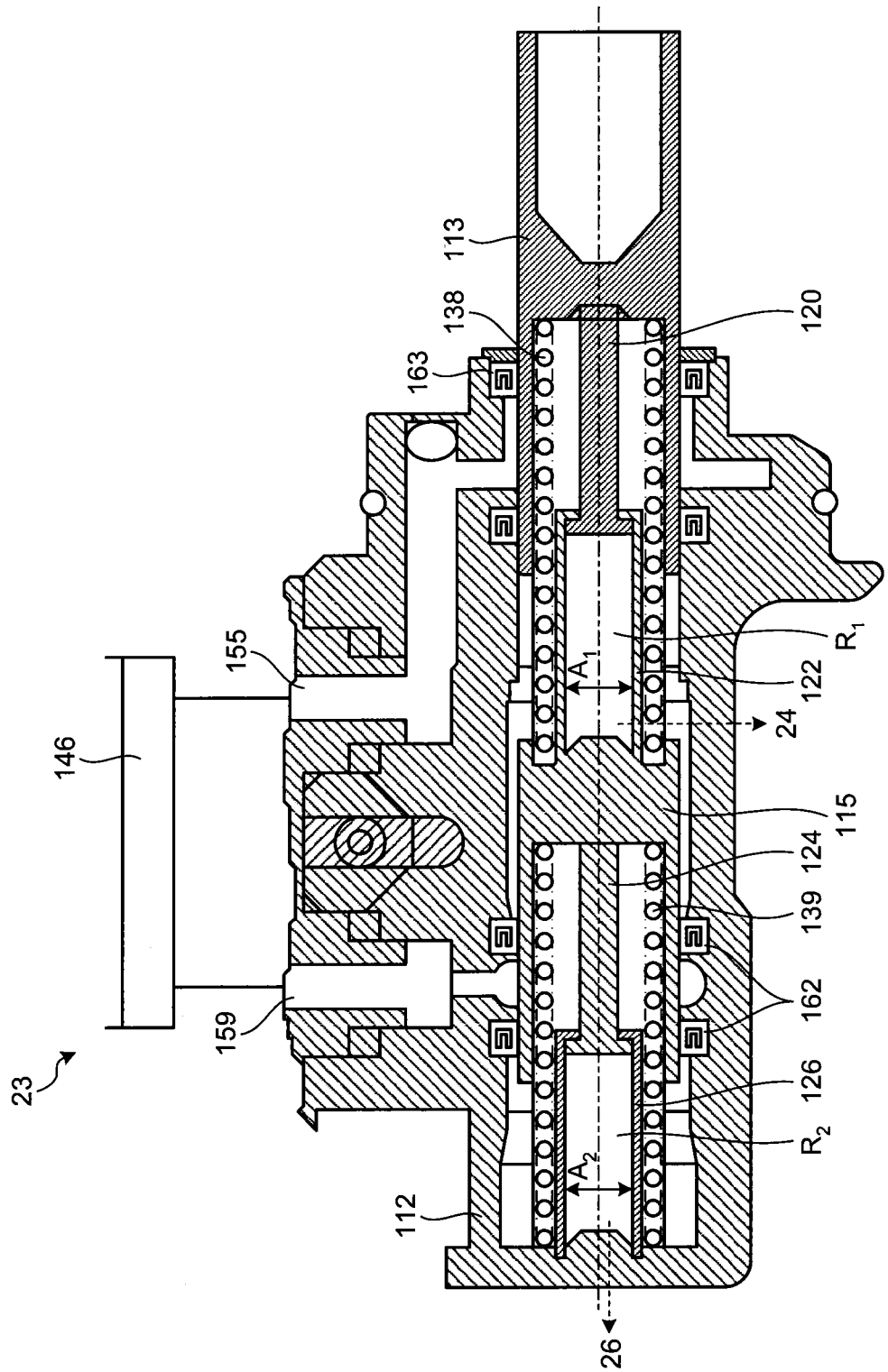
FIG. 2 is a schematic diagram illustrating a schematic configuration of a master cylinder of the braking device.

Next, the master cylinder 23 will be described by referring to FIG. 2. Here, FIG. 2 is a schematic diagram illustrating a schematic configuration of the master cylinder of the braking device. As illustrated in FIG. 2, the master cylinder 23 includes a cylinder 112, an input piston 113, a pressurizing piston 115, a first spring 138, a second spring 139, and a reservoir tank 146.

The cylinder 112 is formed in a cylindrical shape in which the base end is opened and the front end is closed, and the input piston 113 and the pressurizing piston 115 are coaxially disposed in the cylinder and are supported so as to be movable along the axial direction.

In the input piston 113, the outer peripheral surface is supported so as to be movable on the inner peripheral surface of the cylinder 112 having a cylindrical shape. The brake booster device 22 (see FIG. 1) is connected to the base end of the input piston 113 (the base end side of the cylinder 112). Further, a cylindrical portion of which the outer peripheral surface contacts the cylinder 112 and a first piston 120 which is disposed inside the cylindrical portion are disposed at the front end side of the input piston 113. The front end of the first piston 120 is provided with a disk having a larger diameter than that of the other portion. That is, the first piston 120 has a shape in which one end of a bar-like member is connected to the base end of the input piston 113 and the other end is provided with a disk.

The pressurizing piston 115 is disposed at the front end side of the input piston 113 inside the cylinder 112, and the outer peripheral surface thereof is supported so as to be movable on the inner peripheral surface of the cylinder 112. The pressurizing piston 115 is provided with a first cylinder 122 at the side of the input piston 113. The first cylinder 122 is a cylindrical member, and the front end, that is, the disk of the first piston 120 is inserted thereinto. Further, in the first cylinder 122, the inner diameter of the cylinder is substantially equal to the diameter of the disk of the first piston 120, and the end at the side of the input piston 113 is smaller than that of the other portion. That is, the first cylinder 122 is formed in a shape in which the front end of the first piston 120 does not come off. In this way, the space which is formed by the base end side region of the first cylinder 122 and the first piston 120 becomes a first chamber (a first liquid pressure chamber) $R_1$. Furthermore, the area perpendicular to the axis of the first chamber $R_1$, that is, the opening area of the first cylinder 122 becomes an opening area $A_1$. Further, the first chamber $R_1$ is connected to the first hydraulic pipe 24 through a pipe (not illustrated).

Next, the front end side shape of the pressurizing piston 115 is substantially the same as the front end side shape of the input piston 113, and a cylindrical portion having an outer peripheral surface contacting the cylinder 112 and a second piston 124 disposed inside the cylindrical portion are arranged. The front end of the second piston 124 is also provided with a disk which has a diameter larger than that of the other portion.

Next, the cylindrical base end of the cylinder 112, that is, the portion facing the pressurizing piston 115 is provided with a second cylinder 126. The second cylinder 126 is a cylindrical member, and the front end, that is, the disk of the second piston 124 is inserted thereinto. Furthermore, the second cylinder 126 is fixed to the cylinder 112. Further, even in the second cylinder 126, the cylindrical inner diameter is substantially equal to the diameter of the disk of the second piston 124, and the diameter of the end at the side of the pressurizing piston 115 is smaller than that of the other portion. That is, the second cylinder 126 is formed in a shape in which the front end of the second piston 124 does not come off. In this way, the space which is formed by the base end side region of the second cylinder 126 and the second piston 124 becomes a second chamber (a second liquid pressure chamber) $R_2$. Furthermore, the area perpendicular to the axis of the second chamber $R_2$, that is, the opening area of the second cylinder 126 becomes an opening area $A_2$. Furthermore, in the embodiment, the opening area $A_2$ is equal to the opening area $A_1$. Further, the second chamber $R_2$ is connected to the second hydraulic pipe 26 through a pipe (not illustrated).

The first spring 138 is disposed between the input piston 113 and the pressurizing piston 115. Specifically, the first spring is disposed at the inner periphery of the cylindrical portion of the input piston 113 and the outer periphery of the first cylinder 122 of the pressurizing piston 115. The first spring 138 is a return spring, and applies a biasing force in a direction in which the input piston 113 and the pressurizing piston 115 separate from each other in the axial direction. Furthermore, the first spring 138 is a spring which has a non-linear spring characteristic. The spring characteristic of the first spring 138 will be described later.

The second spring 139 is disposed between the pressurizing piston 115 and the base end of the cylinder 112. Specifically, the second spring is disposed in the inner periphery of the cylindrical portion of the pressurizing piston 115 and the outer periphery of the second cylinder 126 of the cylinder 112. The second spring 139 is also a return spring, and applies a biasing force in a direction in which the pressurizing piston 115 and the base end of the cylinder 112 separate from each other in the axial direction.

The reservoir tank 146 is a tank which stores working fluid. Further, the cylinder 112 is provided with a relief pipe 155 and a relief pipe 159. The relief pipe 155 connects the space between the input piston 113 and the pressurizing piston 115 (the space where the first spring 138 is disposed) to the reservoir tank 146. Further, the relief pipe 159 connects the space between the pressurizing piston 115 and the cylinder 112 (the space where the second spring 139 is disposed) to the reservoir tank 146. Accordingly, the working fluid is supplied to two spaces inside the cylinder 112.

Further, the contact portion between the input piston 113 and the cylinder 112 is provided with two seal members 163 that are disposed with the portion, in which the relief pipe 155 supplies the working fluid to the above-described space, interposed therebetween in the axial direction. The seal members 163 suppress the working fluid from leaking between the input piston 113 and the cylinder 112. The contact portion between the pressurizing piston 115 and the cylinder 112 is provided with two seal members 162 that are disposed with the portion, in which the relief pipe 159 supplies the working fluid to the above-described space, interposed therebetween in the axial direction. The seal members 162 suppress the working fluid from leaking between the pressurizing piston 115 and the cylinder 112.

The master cylinder 23 has the above-described configuration, and when a passenger steps on the brake pedal 21, the operating force (the stepping-on force) is transmitted to the brake booster device 22, and the operating force is transmitted to the master cylinder 23 in a boosted state. In the master cylinder 23, when the input piston 113 advances against the biasing force of the first spring 138, the first chamber $R_1$ is pressurized. Then, the hydraulic pressure of the first chamber $R_1$ is discharged to the first hydraulic pipe 24.

Further, when the input piston 113 advances, the input piston 113 presses the pressurizing piston 115 through the first spring 138 and the first chamber $R_1$, and the pressurizing piston 115 advances against the biasing force of the second spring 139. Then, the second chamber $R_2$ is pressurized, and the hydraulic pressure of the second chamber $R_2$ is discharged to the second hydraulic pipe 26.

The vehicle 10 has the above-described configuration, and when the passenger steps on the brake pedal 21, the hydraulic pressure is discharged from the master cylinder 23 to the first hydraulic pipe 24 and the second hydraulic pipe 26. Accordingly, the hydraulic pressure which is discharged from the first chamber $R_1$ of the master cylinder 23 is supplied to the hydraulic braking unit $28_{rf}$ and the hydraulic braking unit $28_{lr}$ through the first hydraulic pipe 24. The hydraulic pressure which is discharged from the second chamber $R_2$ of the master cylinder 23 is supplied to the hydraulic braking unit $28_{lf}$ and the hydraulic braking unit $28_{rr}$ through the second hydraulic pipe 26. In this way, since the hydraulic pressure is discharged from the master cylinder 23 to the respective hydraulic braking units, the brake pad contacts the brake rotor of each hydraulic braking unit, thereby applying the braking force to the tire. Accordingly, the vehicle 10 is decelerated and stopped.

Figure 3:
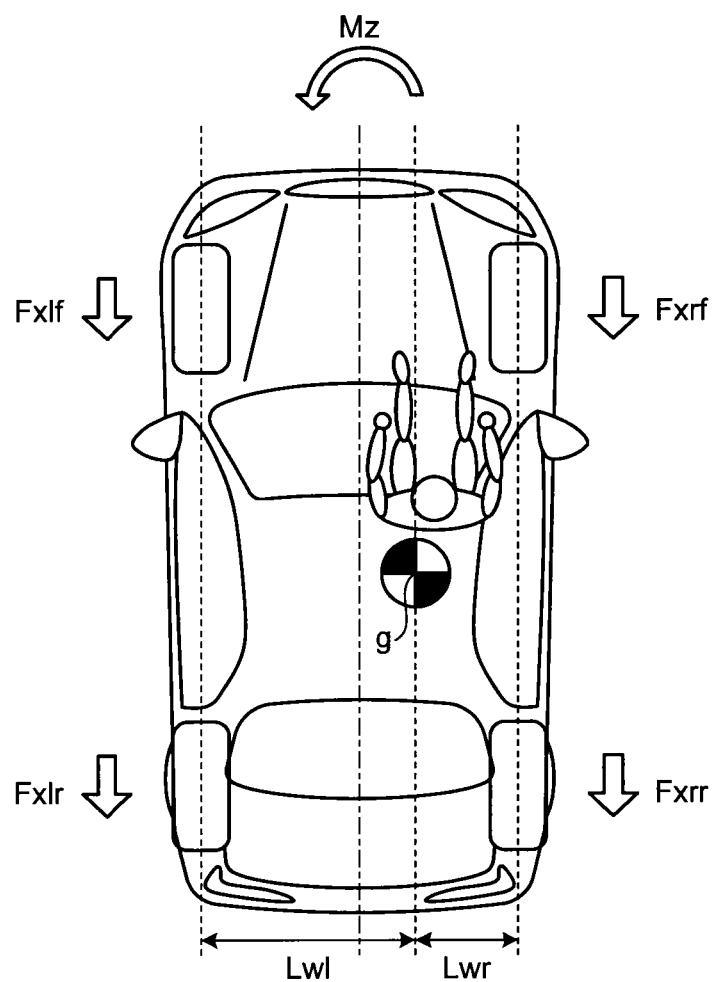
FIG. 3 is an explanatory diagram explaining a force which acts on a vehicle body when braking the vehicle.

In this way, the vehicle 10 applies the braking force to each tire by the braking device 20. That is, as illustrated in FIG. 3, a braking force Fxlf is applied to the left front tire 12 by the hydraulic braking unit $28_{lf}$, a braking force Fxrf is applied to the right front tire 14 by the hydraulic braking unit $28_{rf}$, a braking force Fxlr is applied to the left rear tire 16 by the hydraulic braking unit $28_{lr}$, and a braking force Fxrr is applied to the right rear tire 18 by the hydraulic braking unit $28_{rr}$. Here, FIG. 3 is an explanatory diagram illustrating a force which acts on the vehicle body when braking the vehicle. Furthermore, the larger braking force is applied to the front wheels when braking the vehicle. That is, the braking force Fxlf and the braking force Fxrf are larger than the braking force Fxlr and the braking force Fxrr. Here, the braking force F can be calculated based on the pressure receiving area of the brake pad, the rotor diameter (the diameter of the brake rotor), the friction coefficient (the friction coefficient μ of the brake pad and the brake rotor), the magnitude of the hydraulic pressure, and the tire diameter. Specifically, the braking force can be calculated by F=((pressure receiving area of brake pad)×(rotor diameter)×(friction coefficient)×(hydraulic pressure)×2)/(tire diameter).

In the vehicle 10, as illustrated in FIG. 3, the gravity center g is deviated to the right side (the right tire side) in relation to the middle (the center) in a direction perpendicular to the running direction while a rider (a driver) gets in the vehicle. For this reason, the distance between the left tire (the left front tire 12 and the left rear tire 16) and the gravity center g in a direction perpendicular to the running direction is Lwl, and the distance between the right tire (the right front tire 14 and the right rear tire 18) and the gravity center g is Lwr. Here, the relation between the distance Lwl and the distance Lwr satisfies the inequation of Lwr<Lwl.

Here, as illustrated in FIG. 3, the vehicle 10 of which the gravity center g is not positioned at the middle, that is, the vehicle 10 of which the gravity center is deviated to one side generates a rotation moment Mz when operating the brake. Here, the rotation moment Mz becomes Mz=(Fxlf+Fxlr)×Lwl−(Fxrf+Fxrr)×Lwr. Here, the long-distance component of (Fxlf+Fxlr)×Lwl further increases due to (Fxlf+Fxlr)=(Fxrf+Fxrr), so the moment is generated. Furthermore, the generated moment increases as the deviated distance of the gravity center g increases. When the liquid pressure in which the liquid pressure generated by the first chamber $R_1$ and the liquid pressure generated by the second chamber $R_2$ become substantially equal to each other is output from the master cylinder 23 to the moment generated in this way, the braking force becomes non-uniform by the amount in which the gravity center g is deviated from the middle since (Fxlf+Fxlr) and (Fxrf+Fxrr) are equal to each other. For this reason, the rotation moment Mz is generated, and the vehicle 10 is biased. That is, the vehicle is bent.

On the contrary, the vehicle 10 of the embodiment suppresses the generation of the rotation moment Mz by making the liquid pressure generated by the first chamber $R_1$ different from the liquid pressure generated by the second chamber $R_2$ when braking the vehicle, and hence suppresses the vehicle 10 from being biased when braking the vehicle. Hereinafter, referring to FIGS. 4 to 7, the braking device 20 of the vehicle 10 will be described.

Figure 4:
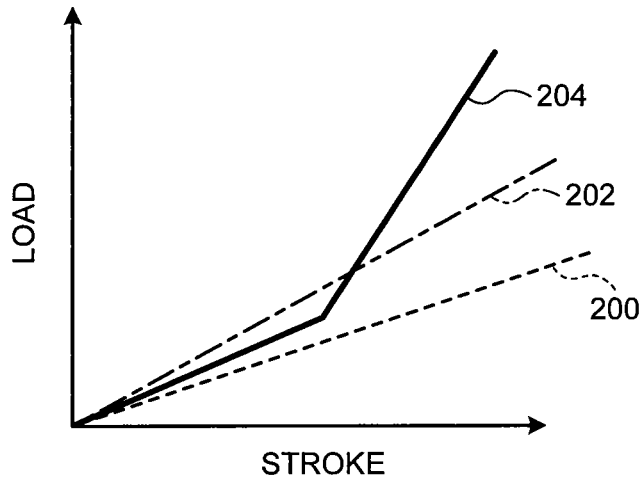
FIG. 4 is a graph illustrating an example of a relation between a load and a stroke of a second spring.

First, the second spring 139 will be described by referring to FIG. 4. Here, FIG. 4 is a graph illustrating an example of a relation between a load and a stroke of the second spring. Furthermore, in the graph illustrated in FIG. 4, the horizontal axis indicates the stroke and the vertical axis indicates the load. Further, the stroke indicates the shrinkage amount of the second spring 139. Further, FIG. 4 also illustrates a line segment 200 representing the same spring characteristic as that of the first spring 138 and a line segment 202 representing a spring characteristic making its deformation (shrinkage) more difficult than that of the first spring 138 in addition to the relation between the load and the stroke of the second spring 139 for the purpose of the comparison.

The second spring 139 is a spring which has a non-linear spring characteristic as in a line segment 204 illustrated in FIG. 4. In the second spring 139, the stroke amount with respect to the load decreases when the stroke becomes a predetermined amount or more as illustrated in the line segment 204 of FIG. 4. That is, the second spring 139 may not easily shrink any more when the spring shrinks by a predetermined distance or more. Here, in the embodiment, the shrinkage amount of the second spring 139 becomes the movement of the second piston 124 with respect to the second cylinder 126, that is, the relative movement between the second cylinder 126 and the second piston 124.

Thus, an external force is applied from the input piston 113 to the master cylinder 23; the first piston 120, the pressurizing piston 115, and the second piston 124 relatively move; and the volumes of the first chamber $R_1$ and the second chamber $R_2$ decrease. When the volume of the second chamber $R_2$ becomes a predetermined volume or less, the second spring 139 does not easily shrink. In this way, when the second spring 139 may not easily shrink, the amount of the decreased volume of the second chamber $R_2$ with respect to the input force decreases. Accordingly, since the amount of the decreased volume of the second chamber $R_2$ is relatively smaller than the amount of the decreased volume of the first chamber $R_1$, the hydraulic pressure discharged from the second chamber $R_2$ becomes lower than the hydraulic pressure discharged from the first chamber $R_1$.

Figure 5:
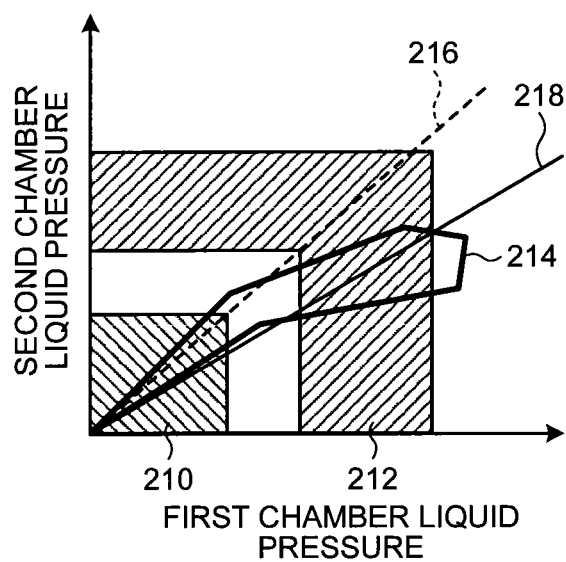
FIG. 5 is a graph illustrating an example of a relation between a first chamber liquid pressure and a second chamber liquid pressure.

With the above-described configuration, the vehicle 10 of the embodiment supplies the liquid pressure illustrated in FIG. 5. Here, FIG. 5 is a graph illustrating an example of a relation between the first chamber liquid pressure and the second chamber liquid pressure. Furthermore, in the graph illustrated in FIG. 5, the horizontal axis indicates the liquid pressure (the hydraulic pressure) [MPa] of the first chamber, and the vertical axis indicates the liquid pressure (the hydraulic pressure) [MPa] of the second chamber. Here, a region 210 illustrated in FIG. 5 is a region in which the stepping-on amount of the brake pedal is small, that is, the external force from the input piston 113 of the master cylinder 23 is small, and a region 212 is a region in which the stepping-on amount of the brake pedal is large, that is, the external force from the input piston 113 of the master cylinder 23 is large. In the region 210, the first chamber liquid pressure and the second chamber liquid pressure both become low pressures, and in the region 212, the first chamber liquid pressure and the second chamber liquid pressure both become the higher pressures than those of the region 210. Further, a bold line 214 illustrated in FIG. 5 illustrates an example of a change in pressure when the brake pedal 21 is actually stepped on and is then opened. Further, a dotted line 216 illustrated in FIG. 5 is a line illustrating a relation in which the first chamber liquid pressure and the second chamber liquid pressure change one to one, and a line 218 is a line illustrating a relation in which a change rate of the first chamber liquid pressure is higher than a change rate of the second chamber liquid pressure by a predetermined rate.

In the master cylinder 23, in a state where the stepping-on amount of the brake pedal 21 is small, the first chamber liquid pressure and the second chamber liquid pressure become values in which the pressures substantially correspond to one to one as indicated by the dotted line 216 in the region 210 indicated by the bold line 214 in FIG. 5. Subsequently, in the master cylinder 23, when the stepping-on amount of the brake pedal 21 increases to a predetermined stepping-on amount or more, that is, the stroke amount (the shrinkage amount) of the second spring 139 becomes a predetermined amount or more, the shrinkage amount of the second spring 139 with respect to the force applied thereto becomes smaller than that of the first spring 138. For this reason, in the master cylinder 23, when the stepping-on amount of the brake pedal 21 becomes a predetermined amount or more, the first chamber liquid pressure becomes larger than the second chamber liquid pressure as indicated by the bold line 214 in the region 212 of FIG. 5. That is, a change rate of the first chamber liquid pressure becomes larger than a change rate of the second chamber liquid pressure. Accordingly, a difference in the ratio between the first chamber liquid pressure and the second chamber liquid pressure in the region 212 becomes larger than a difference in the ratio between the first chamber liquid pressure and the second chamber liquid pressure in the region 210, so that the relation becomes equal to the line 218 in relation to the dotted line 216. Furthermore, in the embodiment, the pressure of the first chamber becomes higher than the pressure of the second chamber.

As illustrated in FIG. 5, the braking device 20 and the vehicle 10 having the same are set so that the liquid pressure in which the liquid pressure of the first chamber $R_1$ is higher than the liquid pressure of the second chamber $R_2$ is supplied when the stepping-on amount of the brake pedal 21 becomes a predetermined amount or more (that is, the movement amount of the input piston 113 becomes a predetermined amount or more, that is, the braking force becomes a predetermined amount or more). More specifically, when the stepping-on amount becomes a predetermined amount or more, a difference in the ratio between the first chamber liquid pressure and the second chamber liquid pressure becomes larger than a difference in the ratio between the first chamber liquid pressure and the second chamber liquid pressure when the stepping-on amount is less than a predetermined amount.

Figure 6:
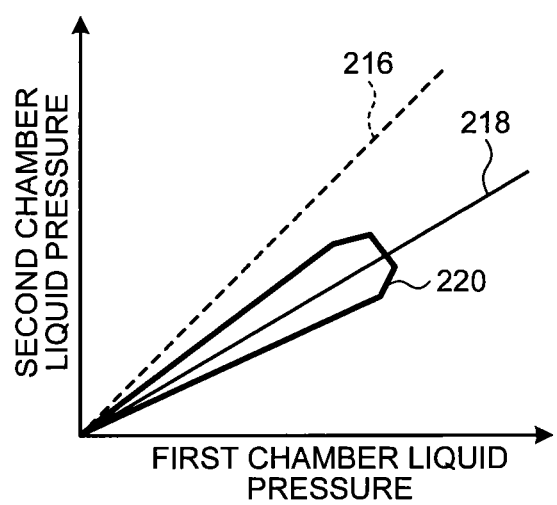
FIG. 6 is a graph illustrating another example of a relation between a first chamber liquid pressure and a second chamber liquid pressure.

Next, FIG. 6 is a graph illustrating another example of a relation between the first chamber liquid pressure and the second chamber liquid pressure. Furthermore, even in the graph illustrated in FIG. 6, the horizontal axis indicates the liquid pressure (the hydraulic pressure) [MPa] of the first chamber, and the vertical axis indicates the liquid pressure (the hydraulic pressure) [MPa] of the second chamber. The graph illustrated in FIG. 6 is an example when using the spring in which the spring characteristic as the second spring satisfies the relation of the line segment 202 illustrated in FIG. 4. That is, the graph illustrated in FIG. 6 is a graph illustrating a relation between the liquid pressures generated by the first chamber $R_1$ and the second chamber $R_2$, that is, the hydraulic pressures discharged to the first hydraulic pipe 24 and the second hydraulic pipe 26 when the liquid pressure is set so that the liquid pressure generated by the first chamber $R_1$ is higher than the liquid pressure generated by the second chamber $R_2$ and the ratio between the liquid pressure of the first chamber $R_1$ and the liquid pressure of the second chamber $R_2$ becomes constant with respect to the input. Further, a bold line 220 also illustrates an example of a change in pressure when the brake pedal 21 is actually stepped on and then opened. Further, the dotted line 216 illustrated in FIG. 6 is a line illustrating a relation in which the first chamber liquid pressure and the second chamber liquid pressure change one to one, and the line 218 is a line illustrating a relation in which a change rate of the first chamber liquid pressure is higher than a change rate of the second chamber liquid pressure by a predetermined rate. Furthermore, in the bold line 220, the relation between the liquid pressure of the first chamber $R_1$ and the liquid pressure of the second chamber $R_2$ changes based on the relation of the line 218, that is, the ratio of the line 218. As illustrated in FIG. 6, when the spring characteristic of the first spring linearly changes as indicated by the line segment 202 illustrated in FIG. 4, it is possible to supply the liquid pressure in which the liquid pressure of the first chamber $R_1$ is higher than that of the second chamber $R_2$.

Since the braking device 20 and the vehicle 10 having the same generate the hydraulic pressure by the master cylinder 23 as illustrated in FIGS. 5 and 6, the braking force Fxrf and the braking force Fxlr can be set to be relatively larger than the braking force Fxlf and the braking force Fxrr. Accordingly, since the component of (Fxrf+Fxrr)×Lwr can become larger and the component of (Fxlf+Fxlr)×Lwl can become smaller, it is possible to decrease the generated rotation moment Mz. Further, since the liquid pressure difference can be set so as to satisfy (Fxrf+Fxrr)×Lwr=(Fxlf+Fxlr)×Lwl, the rotation moment Mz can be set to be smaller so as to ideally become 0.

In this way, the braking device 20 and the vehicle 10 having the same can decrease the rotation moment Mz generated when braking the vehicle by setting a difference in the liquid pressure between the first chamber $R_1$ and the second chamber $R_2$, and hence can suppress the vehicle 10 from being biased when braking the vehicle. Further, the vehicle 10 and the braking device 20 generate a difference in the braking force which is generated by the mechanical structure (that is, the reference setting and the initial setting). For this reason, when adjusting the braking force using a sensor or the like, it is possible to decrease the rotation moment Mz even at the uncontrollable time zone, that is, the initial braking time (from the start of the calculation of the braking operation to the start of the control of the braking force). In particular, in the case of a light vehicle or a vehicle having a short wheelbase, the vehicle can be easily biased when braking the vehicle. However, the braking stability can be improved by generating a difference in braking force as in the embodiment.

Furthermore, in the braking device 20 and the vehicle 10 having the same of the embodiment, the second spring 139 has a characteristic illustrated in the line segment 204 of FIG. 4, the first chamber liquid pressure and the second chamber liquid pressure are generated with the relation illustrated in the bold line 214 of FIG. 5 with respect to the stepping-on amount of the brake pedal, and then the hydraulic pressure is supplied to the respective hydraulic braking units. Accordingly, when the stepping-on amount of the brake pedal is small, that is, the braking force is small, a difference between the first chamber liquid pressure and the second chamber liquid pressure (a difference in ratio) can be decreased. When the braking force is large, a difference between the first chamber liquid pressure and the second chamber liquid pressure (a difference in ratio) can be increased.

Figure 7:
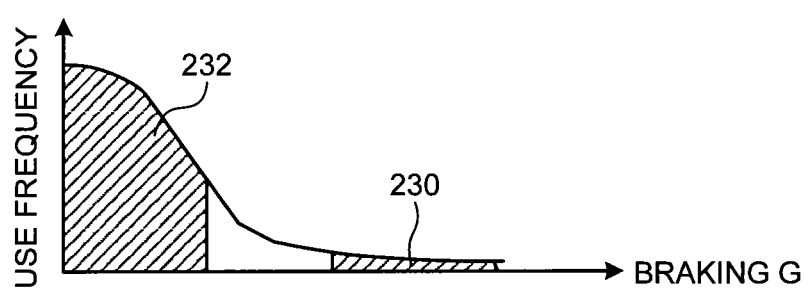
FIG. 7 is a graph illustrating an example of a relation between a use frequency and a braking force of a braking device.

Here, FIG. 7 is a graph illustrating an example of a relation between the use frequency and the braking force of the braking device. Furthermore, in the graph illustrated in FIG. 7, the horizontal axis indicates the braking force (the braking G) and the vertical axis indicates the frequency. As illustrated in FIG. 7, the braking device 20 frequently performs a braking operation having a small braking force, that is, a braking operation for generating the liquid pressure in the range of the region 210 illustrated in FIG. 5. Further, the braking device 20 performs a braking operation having a large braking force, that is, a braking operation for generating the liquid pressure in the range of the region 212 illustrated in FIG. 5 only by a predetermined number. Here, in many cases, the braking operation having a small braking force is performed when smoothly stopping the vehicle or when stopping and decelerating the vehicle as the expectation in a stable running mode. On the contrary, in many cases, the braking operation having a large braking force is performed for an emergent operation such as a sudden braking operation. In this way, since the vehicle needs to be decelerated suddenly due to the emergent operation in many cases, there is a need to more stably control the movement of the vehicle. For this reason, the braking operation having a large braking force becomes a braking stability influence region 230 in which the influence with respect to the braking stability is large.

Further, since the braking operation having a small braking force is used a large number of times, the tire, the brake pad, and the like of the braking device may be mainly abraded. For this reason, the braking operation having a small braking force becomes an abrasion influence region in which the influence with respect to the abrasion is large. Furthermore, since the braking operation having a large braking force is used a small number of times, the influence with respect to the abrasion is small.

Accordingly, in the braking device 20 and the vehicle 10 having the same of the embodiment, the spring characteristic of the second spring 139 becomes non-linear, and the ratio between the first chamber liquid pressure and the second chamber liquid pressure is substantially set to one to one in an abrasion influence region 232, that is, the region 210 of FIG. 5, thereby suppressing the left and right corresponding constituents of the braking device from being non-uniformly abraded. That is, it is possible to suppress the occurrence of the uneven abrasion in which one constituent of the left and right corresponding constituents is largely abraded. Further, in the braking device 20 and the vehicle 10 having the same of the embodiment, a difference between the first chamber liquid pressure and the second chamber liquid pressure (a difference in ratio) is set to be large in the braking stability influence region, that is, the region 212. Accordingly, when a large braking force is generated, an appropriate difference between the left and right braking forces can be generated, and hence as described above, the rotation moment which is generated when braking the vehicle can be decreased. Accordingly, the braking operation can be stabilized.

With the above-described configuration, the braking device 20 and the vehicle 10 having the same of the embodiment can improve the braking stability and suppress the uneven abrasion in a state where the braking force is large and the high braking stability is needed. That is, it is possible to realize the braking stability and the suppression of the uneven abrasion (the improvement in the durability of the device) at an appropriate balance in accordance with the use state.

Figure 8:
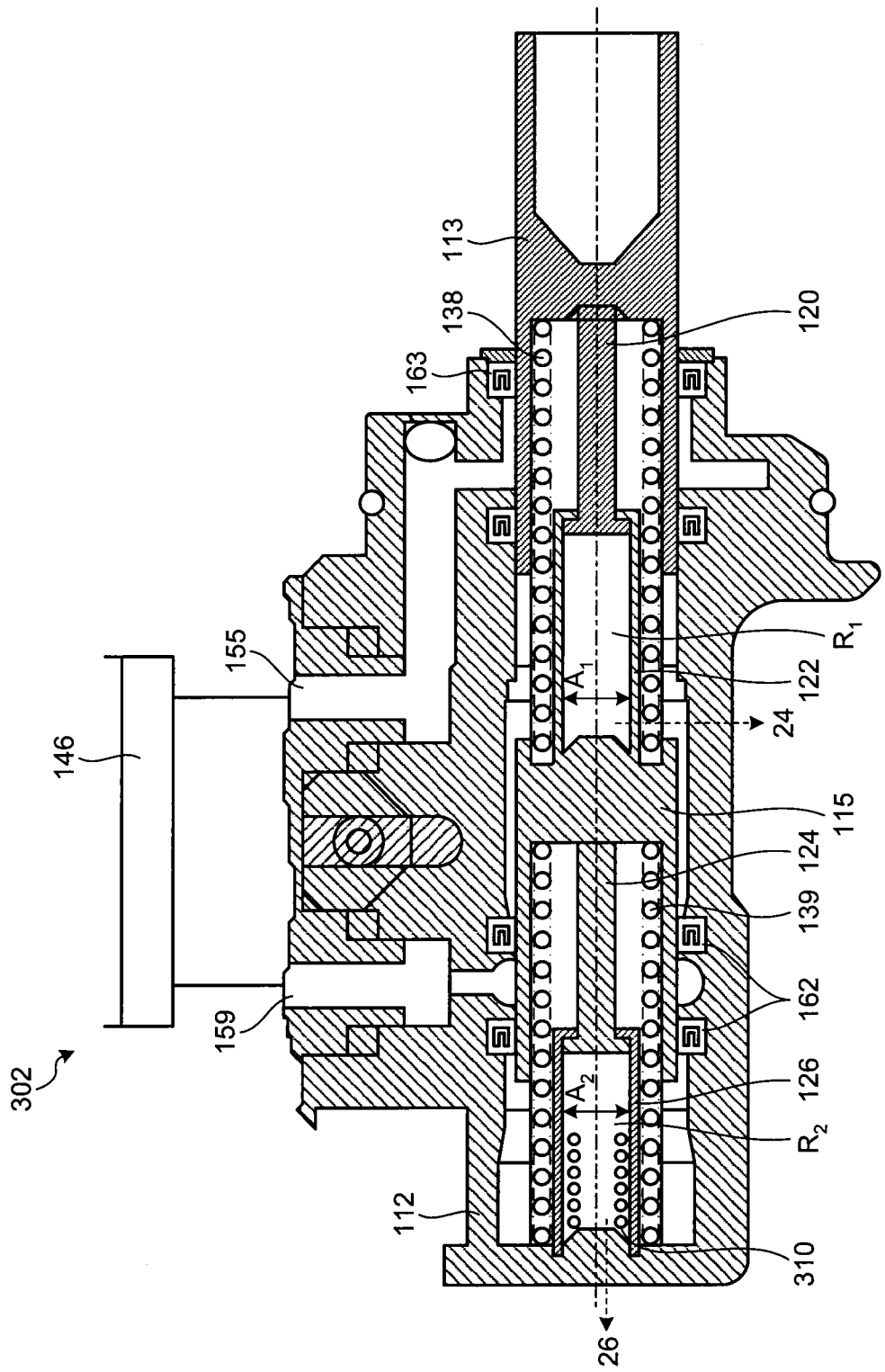
FIG. 8 is a schematic diagram illustrating another example of a schematic configuration of a master cylinder of the braking device.
Figure 9:
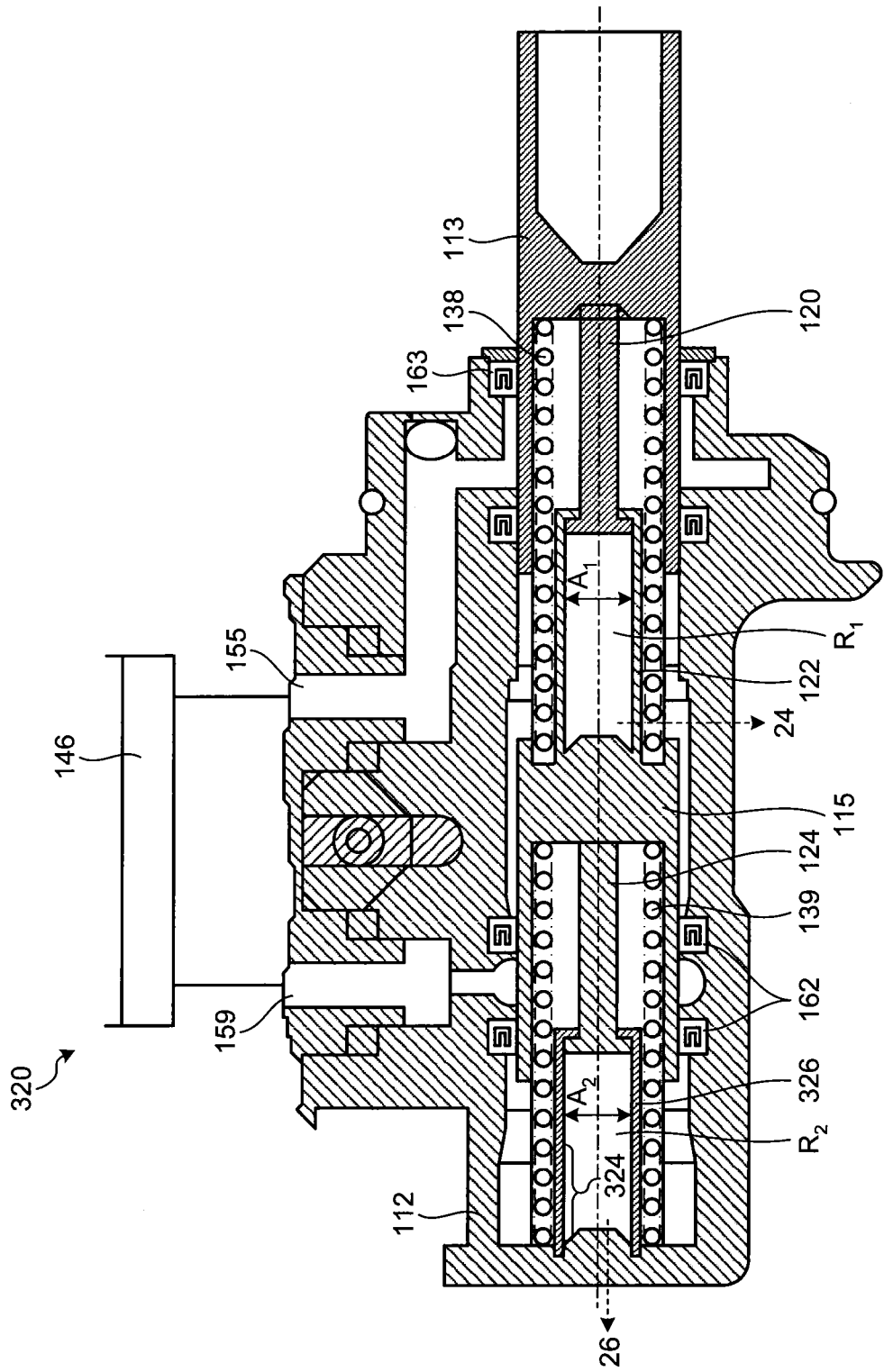
FIG. 9 is a schematic diagram illustrating another example of a schematic configuration of the master cylinder of the braking device.

Here, in the above-described embodiment, a difference in the ratio between the first chamber liquid pressure and the second chamber liquid pressure is set to be changed in the abrasion influence region 232 and the braking stability influence region 230 by configuring the second spring as the non-linear spring, but the present invention is not limited thereto. The braking device can use various configurations in which a difference in the ratio between the first chamber liquid pressure and the second chamber liquid pressure changes, that is, a difference in the ratio between the braking forces generated by one braking unit and the other braking unit changes at the abrasion influence region 232 and the braking stability influence region 230. Hereinafter, referring to FIGS. 8 to 10, another example of the master cylinder used in the braking device will be described. FIGS. 8 to 10 are schematic diagrams respectively illustrating another example of the schematic configuration of the master cylinder of the braking device. Further, the master cylinder illustrated in FIGS. 8 to 10 has the same configuration as that of the master cylinder illustrated in FIG. 2 except that the second spring is not configured as the non-linear spring. Thus, hereinafter, the specific configuration of the master cylinder of each drawing will be described. Furthermore, the second springs 139 of the master cylinders illustrated in FIGS. 8 to 10 are all linear spring.

A master cylinder 302 illustrated in FIG. 8 includes a third spring 310 inside the second cylinder 126. The third spring 310 is a hollow spring, and is disposed inside the second cylinder 126 along the second cylinder 126. Further, the third spring 310 is a member which is shorter than the second cylinder 126 in the axial direction, where one end is disposed at the side of the second piston 124 and the other end is disposed at the opposite end side to the input piston 113 of the cylinder 112.

When an external force is exerted from the input piston 113 to the master cylinder 302, that is, the brake pedal 21 is stepped on, the first piston 120 and the first cylinder 122 move relative to each other. Hereinafter, a case will be described in which the volume of the second chamber $R_2$ decreases from the maximum state. The third spring 310 is disposed between the cylinder 112 and the second piston 124 inside the second cylinder 126 in a state where no force is exerted in the movement direction of the second piston 124 until the volume of the second chamber $R_2$ becomes a predetermined volume even when the volume of the second chamber $R_2$ decreases. Furthermore, the master cylinder 302 decreases the volume of the second chamber $R_2$ and also decreases the volume of the first chamber $R_1$. Accordingly, a predetermined liquid pressure is discharged as described above.

Subsequently, when the volume of the second chamber $R_2$ becomes a predetermined volume or less in the master cylinder 302, both ends of the third spring 310 respectively contact the second piston 124 and the cylinder 112. Subsequently, when the external force is further exerted from the input piston 113, that is, the brake pedal 21 is stepped on, the third spring 310 gradually shrinks. Furthermore, at this time, the third spring 310 becomes a resistance with respect to the relative movement between the second piston 124 and the second cylinder 126. Accordingly, when the volume of the second chamber $R_2$ becomes a predetermined volume or less in the master cylinder 302, the amount of the decreased volume of the first chamber $R_1$ can become larger than the amount of the decreased volume of the second chamber $R_2$.

In this way, even when the third spring 310 is provided as in the master cylinder 302, that is, the spring is provided as multiple stages, it is possible to further increase a difference in the ratio of the liquid pressure when the stepping-on amount of the brake pedal 21 becomes a predetermined amount or more, that is, the braking force becomes a predetermined amount or more as described above. That is, it is possible to increase a difference in the braking force.

In a master cylinder 320 illustrated in FIG. 9, a second cylinder 326 is formed so that the roughness (the surface roughness) of a region 324 at the side of the cylinder 112 (at the opposite side to the second piston 124) of the inner surface is rougher than the roughness of the region at the side of the input piston 113 (the first piston 120).

When the external force is exerted from the input piston 113 to the master cylinder 320, that is, the brake pedal 21 is stepped on, the second piston 124 and the second cylinder 326 move relative to each other. Hereinafter, a case will be described in which the volume of the first chamber $R_1$ decreases from the maximum state. When the external force is exerted from the input piston 113 to the master cylinder 320, that is, the brake pedal is stepped on, the second piston 124 and the second cylinder 326 move relative to each other in a sliding manner, so that the volume of the second chamber $R_2$ decreases. Furthermore, the master cylinder 320 decreases the volume of the second chamber $R_2$ and also decreases the volume of the first chamber $R_1$. Accordingly, a predetermined liquid pressure is discharged as described above.

Subsequently, when the volume of the second chamber $R_2$ becomes a predetermined volume or less in the master cylinder 320, the front end of the second piston 124 contacts the region 324 of the second cylinder 326. Subsequently, when the external force is further exerted from the input piston 113, that is, the brake pedal 21 is stepped on, the front end of the second piston 124 moves while contacting the region 324 of the second cylinder 326. At this time, since the roughness of the region 324 is rougher than that of the other region, the region becomes a resistance with respect to the relative movement between the second piston 124 and the second cylinder 326. Accordingly, when the volume of the second chamber $R_2$ becomes a predetermined volume or less in the master cylinder 320, the amount of the decreased volume of the first chamber $R_1$ can become larger than the amount of the decreased volume of the second chamber $R_2$.

In this way, even when the roughness of the contact surface of the second cylinder 326 with respect to the second piston 124 changes for each region as in the master cylinder 320, a difference in the ratio of the liquid pressure can be further increased when the stepping-on amount of the brake pedal becomes a predetermined amount or more, that is, the braking force becomes a predetermined amount or more as described above. That is, it is possible to increase a difference in the braking force.

In a master cylinder 340 illustrated in FIG. 10, a second cylinder 342 is provided with a protrusion 344 which is formed at the side of the cylinder 112 so as to have a diameter smaller than that of the input piston 113 (the second piston 124). Furthermore, the protrusion 344 has a deformable shape and becomes a resistance for the passage of the second piston 124. However, the second piston 124 is not immovably fixed. That is, the second piston 124 can move to the cylinder 112 with respect to the second cylinder 342 while contacting the protrusion 344.

When the external force is exerted from the input piston 113 to the master cylinder 340, that is, the brake pedal 21 is stepped on, the second piston 124 and the second cylinder 342 move relative to each other. Hereinafter, a case will be described in which the volume of the second chamber $R_2$ decreases from the maximum state. When the external force is exerted from the input piston 113 to the master cylinder 340, that is, the brake pedal 21 is stepped on, the second piston 124 and the second cylinder 342 move relative to each other in a sliding manner, so that the volume of the second chamber $R_2$ decreases. Furthermore, the master cylinder 340 decreases the volume of the second chamber $R_2$ and also decreases the volume of the first chamber $R_1$. Accordingly, a predetermined liquid pressure is discharged as described above.

Subsequently, when the volume of the second chamber $R_2$ becomes a predetermined volume or less in the master cylinder 340, the front end of the second piston 124 contacts the protrusion 344 of the second cylinder 342. Subsequently, when the external force is exerted from the input piston 113, that is, the brake pedal is stepped on, the front end of the second piston 124 moves while contacting the protrusion 344 of the second cylinder 342. At this time, since the diameter of the second cylinder 342 is smaller than that of the other region, the protrusion 344 becomes a resistance with respect to the relative movement between the second piston 124 and the second cylinder 342. Accordingly, when the volume of the second chamber $R_2$ becomes a predetermined volume or less in the master cylinder 340, the amount of the decreased volume of the first chamber $R_1$ becomes larger than the amount of the decreased volume of the second chamber $R_2$.

In this way, even when the protrusion is provided in the contact surface of the second cylinder 342 with respect to the second piston 124 as in the master cylinder 340, a difference in the ratio of the liquid pressure can be increased when the stepping-on amount of the brake pedal 21 becomes a predetermined amount or more, that is, the braking force becomes a predetermined amount or more as described above. That is, a difference in the braking force can be increased. Furthermore, the shape of the protrusion is not particularly limited. Further, the shape is not also limited.

Furthermore, in the above-described embodiment, the rotation moment Mz is calculated from the braking forces of four vehicle wheels constituting the vehicle, and the liquid pressure difference for suppressing the rotation moment Mz generated when the driver gets on is calculated. However, the liquid pressure difference for suppressing the rotation moment Mz may be calculated only by the front wheels having the larger braking forces. That is, the relation between the braking forces satisfying the equation of Fxlf×Lwl=Fxrf× Lwr may be calculated by using the equation of Mz=Fxlf× Lwl−Fxrf×Lwr, and the liquid pressure difference may be set based on the relation.

Further, it is desirable that the braking device has a configuration in which the liquid pressure difference between the first chamber and the second chamber does not occur, that is, the relation between the first chamber liquid pressure and the second chamber liquid pressure is set to be one to one in the abrasion influence region (the region having a small braking force and a low liquid pressure). In this way, the uneven abrasion can be further reliably suppressed by setting the relation between the first chamber liquid pressure and the second chamber liquid pressure to one to one in the abrasion influence region.

Further, it is desirable that the braking device has a configuration in which the input piston side liquid pressure chamber (in the embodiment, the first chamber becomes the liquid pressure chamber generating the higher liquid pressure as in the embodiment. That is, it is desirable to dispose the liquid pressure chamber which needs to generate the higher liquid pressure near the input piston. Accordingly, since the liquid pressure chamber which can easily increase the liquid pressure from the viewpoint of the structure can be set to the liquid pressure chamber which generates the higher liquid pressure, it is possible to generate the high liquid pressure in the corresponding liquid pressure chamber with the simpler configuration. Furthermore, the liquid pressure chamber which generates the higher liquid pressure is basically the liquid pressure chamber which supplies the liquid pressure causing the braking force to act on the tire near the gravity center among the front wheels of the vehicle. Furthermore, since the above-described effect can be obtained, it is desirable to set the relation between the liquid pressure chamber supplying the liquid pressure and the tire (the hydraulic braking unit) as in the embodiment, but the opposite relation may be set.

Further, it is desirable that the braking device has a configuration in which the liquid pressure chamber of which the liquid pressure relatively decreases is provided with the constituents (the non-linear spring, the multi-stage spring, and the resistance) for making a decrease in the volume of the liquid pressure chamber difficult as in the embodiment. Accordingly, it is possible to change the liquid pressure with a simple configuration. Furthermore, the embodiment is not limited thereto, and the volume of the liquid pressure chamber easily decreases in the liquid pressure chamber of which the liquid pressure relatively increases. That is, the resistance for the movement of the piston may be decreased. For example, the sliding resistance may decrease with the movement of the piston.

Further, the braking device may be set so that the liquid pressure difference between the first chamber and the second chamber, that is, the braking force difference is normally generated and the liquid pressure difference between the first chamber and the second chamber further increases, that is, a difference in the ratio between the first chamber liquid pressure and the second chamber liquid pressure further increases when the braking force becomes a predetermined amount or more. In this way, when the liquid pressure difference is set to be normally generated, the braking stability in the abrasion influence region can be improved. Furthermore, even in this case, the uneven abrasion can be suppressed by decreasing the liquid pressure difference (or a difference in the ratio of the liquid pressure).

Furthermore, when the liquid pressure difference between the first chamber and the second chamber is normally generated, the liquid pressure difference (that is, the braking force difference) can be calculated as the liquid pressure difference ((the liquid pressure of the first chamber)−(the liquid pressure of the second chamber))=$(G_2-G_1+N_2)/A$ when the spring load of the first spring 138 is denoted by $G_1$, the spring load of the second spring 139 is denoted by $G_2$, the sliding resistance between the pressurizing piston 115 and the cylinder 112 is denoted by $N_2$, and the area of the first cylinder 122 and the second cylinder 126 is denoted by A. That is, the liquid pressure difference can be adjusted by the spring loads of the first spring 138 and the second spring 139 and the sliding resistance between the pressurizing piston 115 and the cylinder 112.

Further, in the above-described embodiment, the opening area $A_1$ of the first cylinder 122 and the opening area $A_2$ of the second cylinder 126 are set to the same area, but the liquid pressure difference can be adjusted even by two opening areas. Furthermore, as a method of setting the liquid pressure generated by the first chamber $R_1$ and the liquid pressure generated by the second chamber $R_2$ of the master cylinder 23 to different liquid pressures, various methods can be used in addition thereto.

Further, in the above-described embodiment, since the control is easily performed and the influence on the vehicle balance can be reduced, it is desirable to provide the braking force difference by the liquid pressure difference and the hydraulic pressure difference supplied from the master cylinder, but the setting of normally generating the braking force difference is not limited thereto. The braking force difference can be generated by setting various conditions influencing the braking force to be different at the left and right sides (the side close to the gravity center and the side away from the gravity center in a direction perpendicular to the running direction). Specifically, the braking force difference can be generated by setting the pressure receiving area of the brake pad, the rotor diameter, the friction coefficient, and the tire diameter to different values at the left and right sides. Furthermore, when the tire diameters are set to different tire diameters, the running performance is degraded. For this reason, it is desirable to adjust the subject other than the tire diameter.

Here, in the above-described embodiment, the liquid pressure difference generated by the first chamber and the second chamber, that is, a difference between the braking force generated by the right tire of the vehicle and the braking force generated by the left tire of the vehicle (referred to as the "braking force difference") is defined on the assumption that only the rider (the driver) gets on the vehicle, that is, only one person gets on the vehicle. However, it is desirable to calculate the braking force difference by assuming various gravity centers. In this way, when the braking force difference is set by assuming various gravity centers, that is, various use states, it is possible to decrease the generated rotation moment Mz in any use state. Here, when calculating the braking force difference by assuming various gravity centers, it is desirable to set the braking force difference so that the generated rotation moment Mz is within the set range. Accordingly, the rotation moment Mz generated when braking the vehicle can be set to be within a predetermined range (the substantially identical range) even in any case. Thus, the vehicle can run at the same condition regardless of the use state.

Further, it is desirable to set the vehicle 10 so that the braking force difference has substantially the same (identical) rotation moment Mz regardless of whether one person or two persons get on the vehicle. In this way, when the cases where one person and two persons get on the vehicle are added, it is possible to assume a case where the number of passengers at the left side of the vehicle is equal to the number of passengers at the right side of the vehicle and a case where the number of passengers at the left side of the vehicle is different from the number of passengers at the right side of the vehicle by one person. Accordingly, even in the case where three or four persons get on the vehicle, the balance of the gravity center is substantially identical, and hence it is possible to suppress the use state in which the large rotation moment Mz is generated.

INDUSTRIAL APPLICABILITY

As described above, the braking device and the vehicle according to the present invention are useful to decrease the speed of the running vehicle.

REFERENCE SIGNS LIST

10 vehicle
11 vehicle body
20 braking device
23 master cylinder
24 first hydraulic pipe
26 second hydraulic pipe
28$_{lf}$, 28$_{rf}$, 28$_{lr}$, 28$_{rr}$ hydraulic braking unit

The invention claimed is:

1. A braking device that applies a braking force to a first tire rotatably arranged on a side close to a gravity center of a vehicle body and a second tire rotatably arranged on a side away from the gravity center of the vehicle body, the braking device comprising:
    a master cylinder configured to include a first liquid pressure chamber and a second liquid pressure chamber that supply a liquid pressure;
    a piston configured to apply an external force to the first liquid pressure chamber and the second liquid pressure chamber;
    a first hydraulic braking unit configured to apply a braking force to the first tire based on the liquid pressure supplied from the first liquid pressure chamber; and
    a second hydraulic braking unit configured to apply a braking force to the second tire based on the liquid pressure supplied from the second liquid pressure chamber, wherein
    a pressure of the first liquid pressure chamber is equal to a pressure of the second liquid pressure chamber in the master cylinder in a state where a stroke amount of the piston is smaller than a set value,
    a difference between the pressure of the first liquid pressure chamber and the pressure of the second liquid pressure chamber in the master cylinder when a stroke amount of the piston is large becomes larger than a difference between the pressure of the first liquid pressure chamber and the pressure of the second liquid pressure chamber when the stroke amount of the piston is small, and the pressure of the first liquid pressure chamber is larger than the pressure of the second liquid pressure chamber,
    at least one of the first liquid pressure chamber and the second liquid pressure chamber is provided with a return spring or a multi-stage spring having a non-linear spring characteristic,
    the braking device is set so that the braking force close to the gravity center is larger than the braking force away from the gravity center in a direction perpendicular to the running direction of the vehicle body while a rider gets in the vehicle, and
    the braking device is set so that a difference in the ratio between the braking force close to the gravity center and the braking force away from the gravity center when the braking force is large becomes larger than a difference in the ratio between the braking force close to the gravity center and the braking force away from the gravity center when the braking force is small.

2. The braking device according to claim 1, wherein a sliding resistance generated inside the first liquid pressure chamber with respect to the movement of the piston and a sliding resistance generated inside the second liquid pressure chamber with respect to the movement of the piston in the master cylinder change by the stroke amount of the piston.

3. The braking device according to claim 2, wherein the first liquid pressure chamber in the master cylinder is disposed nearer an end receiving the external force from the piston in relation to the second liquid pressure chamber, and
the second liquid pressure chamber is provided with a resisting component that makes a decrease in a volume of the liquid pressure chamber difficult when the stroke amount of the piston increases.

4. The braking device according to claim 1, wherein the first liquid pressure chamber in the master cylinder is disposed nearer an end receiving the external force from the piston in relation to the second liquid pressure chamber, and
the second liquid pressure chamber is provided with a resisting component that makes a decrease in a volume of the liquid pressure chamber difficult when the stroke amount of the piston increases.

5. The braking device according to claim 1, wherein a sliding resistance generated inside the first liquid pressure chamber with respect to the movement of the piston and a sliding resistance generated inside the second liquid pressure chamber with respect to the movement of the piston in the master cylinder change by the stroke amount of the piston.

6. The braking device according to claim 1, wherein the first liquid pressure chamber in the master cylinder is disposed nearer an end receiving the external force from the piston in relation to the second liquid pressure chamber, and
the second liquid pressure chamber is provided with a resisting component that makes a decrease in a volume of the liquid pressure chamber difficult when the stroke amount of the piston increases.

7. The braking device according to claim 1, wherein the first tire and the second tire are disposed at the front side of the vehicle body in the running direction.

8. The braking device according to claim 1, wherein the difference in pressure between the first liquid pressure chamber and the second liquid pressure chamber reduces the rotational moment that occurs during braking.

9. A braking device that applies a braking force to a first tire rotatably arranged on a side close to a gravity center of a vehicle body and a second tire rotatably arranged on a side away from the gravity center of the vehicle body, the braking device comprising:

a master cylinder configured to include a first liquid pressure chamber and a second liquid pressure chamber that supply a liquid pressure;

a piston configured to apply an external force to the first liquid pressure chamber and the second liquid pressure chamber;

a first hydraulic braking unit configured to apply a braking force to the first tire based on the liquid pressure supplied from the first liquid pressure chamber; and a second hydraulic braking unit configured to apply a braking force to the second tire based on the liquid pressure supplied from the second liquid pressure chamber, wherein a pressure of the first liquid pressure chamber is equal to a pressure of the second liquid pressure chamber in the master cylinder in a state where a stroke amount of the piston is smaller than a set value, a difference between the pressure of the first liquid pressure chamber and the pressure of the second liquid pressure chamber in the master cylinder when a stroke amount of the piston is large becomes larger than a difference between the pressure of the first liquid pressure chamber and the pressure of the second liquid pressure chamber when the stroke amount of the piston is small, and the pressure of the first liquid pressure chamber is larger than the pressure of the second liquid pressure chamber, at least one of the first liquid pressure chamber and the second liquid pressure chamber is provided with a return spring or a multi-stage spring having a non-linear spring characteristic, the braking device is set so that the braking force close to the gravity center is larger than the braking force away from the gravity center in a direction perpendicular to the running direction of the vehicle body while a rider gets in the vehicle, the braking device is set so that a difference in the ratio between the braking force close to the gravity center and the braking force away from the gravity center when the braking force is large becomes larger than a difference in the ratio between the braking force close to the gravity center and the braking force away from the gravity center when the braking force is small, and a sliding resistance generated inside the first liquid pressure chamber with respect to the movement of the piston and a sliding resistance generated inside the second liquid pressure chamber with respect to the movement of the piston change by the stroke amount of the piston.

10. The braking device according to claim 9, wherein the first liquid pressure chamber in the master cylinder is disposed nearer an end receiving the external force from the piston in relation to the second liquid pressure chamber, and the second liquid pressure chamber is provided with a resisting component that makes a decrease in a volume of the liquid pressure chamber difficult when the stroke amount of the piston increases.

* * * * *